United States Patent [19]

Walker

[11] Patent Number: 5,765,016

[45] Date of Patent: Jun. 9, 1998

[54] REORDER BUFFER CONFIGURED TO STORE BOTH SPECULATIVE AND COMMITTED REGISTER STATES

[75] Inventor: Wade A. Walker, Austin, Tex.

[73] Assignee: Advanced Micro Devices, Inc., Sunnyvale, Calif.

[21] Appl. No.: 712,809

[22] Filed: Sep. 12, 1996

[51] Int. Cl.$^6$ ............................................. G06H 9/30
[52] U.S. Cl. .................. 39/800.23; 355/393; 355/394
[58] Field of Search ..................... 395/800.23, 391, 395/392, 394, 580

[56] References Cited

U.S. PATENT DOCUMENTS

| | | | |
|---|---|---|---|
| 4,044,338 | 8/1977 | Wolf | 365/49 |
| 4,453,212 | 6/1984 | Gaither et al. | 711/2 |
| 4,807,115 | 2/1989 | Torng | 395/39 |
| 4,858,105 | 8/1989 | Kuriyama et al. | 395/582 |
| 4,928,223 | 5/1990 | Dao et al. | 395/597 |
| 5,053,631 | 10/1991 | Perlman et al. | 364/748.14 |
| 5,058,048 | 10/1991 | Gupta et al. | 364/748.14 |
| 5,129,067 | 7/1992 | Johnson | 395/389 |
| 5,136,697 | 8/1992 | Johnson | 395/586 |
| 5,155,817 | 10/1992 | Kishigami et al. | 395/394 |
| 5,226,126 | 7/1993 | McFarland et al. | 395/394 |
| 5,226,130 | 7/1993 | Favor et al. | 395/585 |
| 5,404,551 | 4/1995 | Katsumo | 395/800.23 |
| 5,481,683 | 1/1996 | Karim | 395/393 |

FOREIGN PATENT DOCUMENTS

| | | |
|---|---|---|
| 0259095 | 3/1988 | European Pat. Off. |
| 0381471 | 8/1990 | European Pat. Off. |
| 0459232 | 12/1991 | European Pat. Off. |
| 2263985 | 8/1993 | United Kingdom |
| 2263987 | 8/1993 | United Kingdom |
| 2281422 | 3/1995 | United Kingdom |

OTHER PUBLICATIONS

Lenell et al. "A ZomHz CMOS Reorder Buffer for Superscalar Microprocessor" 1992.

Moudgill et al. "Register Renaming and Dynamic Speculation on Alternative Approach" 1993.

Intel, "Chapter 2: Microprocessor Architecture Overview," pp. 2–1 through 2–4.

Michael Slater, "AMD's K5 Designed to Outrun Pentium," Microprocessor Report, vol. 8, No. 14, Oct. 24, 1994, 7 pages.

Sebastian Rupley and John Clyman, "P6: The Next Step?," PC Magazine, Sep. 12, 1995, 16 pages.

Tom R. Halfhill, "AMD K6 Takes on Intel P6," BYTE, Jan. 1996, 4 pages.

*Primary Examiner*—Larry D. Donaghue
*Attorney, Agent, or Firm*—Conely, Rose & Tayon; B. Noel Kivlin

[57] ABSTRACT

A reorder buffer including a speculative storage section and a retired storage section is provided. The speculative storage section stores speculative register states; while the retired storage section stores committed register states corresponding to the execution of instructions which have been retired. The dependency checking logic of the reorder buffer checks dependencies for operands of instructions being dispatched against both the speculative and retired storage sections. In this manner, a dependency is always detected within the reorder buffer. Therefore, no selection between a register file value and a value provided from the reorder buffer need be made. In fact, the register file may be eliminated from a microprocessor employing the reorder buffer. The retired storage section comprises a shiftable queue in one embodiment. The shiftable queue stores committed register states and indications of the architected registers corresponding to the committed register states. As new committed register states are moved into the retired storage section, committed register states are shifted within the shiftable queue such that the old committed register states corresponding to the architected registers updated by the new committed register states are discarded. The new committed register states are stored into the head of the queue. A dynamic assignment of storage locations to architected registers is maintained.

20 Claims, 8 Drawing Sheets

| 0 | $V_0$ | ECX |
| --- | --- | --- |
| 1 | $V_1$ | ESP |
| 2 | $V_2$ | EAX |
| 3 | $V_3$ | EBX |
| 4 | $V_4$ | EBP |
| 5 | $V_5$ | EDX |
| 6 | $V_6$ | ESI |
| 7 | $V_7$ | EDI |

110

$R_1 = EAX, V_8$
$R_2 = EDX, V_9$

112

| 0 | $V_8$ | EAX |
| --- | --- | --- |
| 1 | $V_9$ | EDX |
| 2 | $V_0$ | ECX |
| 3 | $V_1$ | ESP |
| 4 | $V_3$ | EBX |
| 5 | $V_4$ | EBP |
| 6 | $V_6$ | ESI |
| 7 | $V_7$ | EDI |

REORDER BUFFER CONFIGURED TO STORE BOTH SPECULATIVE AND COMMITTED REGISTER STATES

BACKGROUND OF THE INVENTION

1. Field of the Invention

This invention relates to the field of microprocessors and, more particularly, to reorder buffers employed within microprocessors.

2. Description of the Relevant Art

Superscalar microprocessors achieve high performance by executing multiple instructions per clock cycle and by choosing the shortest possible clock cycle consistent with the design. As used herein, the term "clock cycle" refers to an interval of time accorded to various stages of an instruction processing pipeline within the microprocessor. Storage devices (e.g. registers and arrays) capture their values according to the clock cycle. For example, a storage device may capture a value according to a rising or falling edge of a clock signal defining the clock cycle. The storage device then stores the value until the subsequent rising or falling edge of the clock signal, respectively. The term "instruction processing pipeline" is used herein to refer to the logic circuits employed to process instructions in a pipelined fashion. Although the pipeline may be divided into any number of stages at which portions of instruction processing are performed, instruction processing generally comprises fetching the instruction, decoding the instruction, executing the instruction, and storing the resulting instruction execution results in the destination identified by the instruction.

Many superscalar microprocessors employ a reorder buffer to enhance the number of instructions executed per clock cycle by allowing out of order instruction execution. Often, a sequence of instructions may be executed more efficiently if the instructions are executed in an order other than the order listed in the original program sequence (the "program order"). While an instruction which is dependent upon another instruction (i.e. receives an operand generated as an instruction execution result of the other instruction) generally must execute after that instruction, instructions which are independent of each other may be executed in any order as long as the result is the same as executing the instructions in order.

Instructions which are executed out of order may be speculatively executed. Generally, an instruction is speculatively executed if it is executed prior to knowing that the instruction is required according to sequential execution of the program. A particular instruction which is speculatively executed may be subsequent to a predicted branch or an instruction which may cause an exception. If the branch is mispredicted or the instruction generates an exception, the particular instruction is erroneously executed (i.e. the actual stream of executed instructions does not include the erroneously executed instruction). Performance is increased when speculative execution and the actual instruction stream coincide, such that the speculative instruction execution results are eventually committed to architected storage locations (e.g. registers or memory locations). Alternatively, the speculative instruction execution results are discarded by the reorder buffer when speculative execution and the actual instruction stream do not coincide.

Instruction execution results which update an architected register and correspond to non-retired instructions are speculative register states. The values generated may be incorrect based upon the execution of other instructions prior to the instructions generating the speculative registers states within the reorder buffer. On the other hand, instruction execution results which update an architected register and correspond to retired instructions are committed register states. Committed register states cannot be discarded due to branch misprediction or exception.

The reorder buffer ensures the correct transition of a particular instruction execution result from a speculative register state to a committed register state by retiring the instructions in order. As instructions are dispatched (in program order), the instructions are allocated storage in the reorder buffer. Instructions may execute in any order as long as dependencies between the instructions are respected. The instruction execution results (i.e. the values generated in response to execution of the instruction) are conveyed to the reorder buffer, which stores the instruction execution results until the corresponding instructions are retired. Generally speaking, an instruction is retired if its results are committed into the state of the microprocessor. Until an instruction is retired, it may be discarded from the reorder buffer and the results generated via execution of the instruction are discarded as well. The state of the microprocessor is thereby unaffected by execution of the discarded instruction. It is noted that the "state" of the microprocessor in part defines the response of the microprocessor to subsequent instructions. The state includes the values stored in various "architected registers". An architected register is a register which may be directly read or written via execution of an instruction. Architected registers may be used to store source operands for an instruction. Furthermore, architected registers may be specified as the destination of an instruction. Architected registers are defined by the microprocessor architecture employed by the microprocessor.

Generally speaking, when an instruction is retired by the reorder buffer, the instruction execution results are stored into the destination. The destination may be an architected register or a memory location. If the destination is an architected register, the reorder buffer conveys the value to the register. Typically, superscalar microprocessors employ a register file comprising a storage location assigned to each architected register. The instruction execution result and an indication of the register to be updated is conveyed to the register file for storage upon retirement of the instruction.

Unfortunately, the present reorder buffer/register file combination presents difficulties in the design of microprocessors. As each instruction is dispatched, the reorder buffer searches the instructions stored therein for updates to the operands specified for the dispatching instruction. If an update is located, the value (or a tag indicative of the value, if the value has not yet been generated by execution of the instruction) is forwarded to the execution unit receiving the instruction. On the other hand, no update may be found for a given operand. In this case, the value stored in the register file is conveyed. Typically, the receiving execution unit must select between the two values, adding additional hardware to the hardware needed to execute the instruction. Additionally, the register file must be capable of both storing a value into a storage location and forwarding that value in the same clock cycle. This capability is needed for cases in which an instruction which updates the register retires in the same cycle as a subsequent instruction which reads the register is dispatched. Since the instruction is retired, the reorder buffer no longer has a record of the instruction. Therefore, the value must come from the register file. Furthermore, the reorder buffer and the register file are separate structures which are separated by a finite physical distance on a semiconductor die. This distance is bridged by an interconnected having an associated interconnect delay. As microprocessors achieve shorter clock cycle times, the interconnect delay becomes an even more prevalent problem.

SUMMARY OF THE INVENTION

The problems outlined above are in large part solved by a reorder buffer in accordance with the present invention. The reorder buffer includes a speculative storage section and a retired storage section. The speculative storage section stores speculative register states generated by the speculative (and possibly out of order) execution of instructions. Conversely, the retired storage section stores committed register states corresponding to the execution of instructions which have been retired. The dependency checking logic of the reorder buffer checks dependencies for operands of instructions being dispatched against both the speculative and retired storage sections. In this manner, a dependency is always detected within the reorder buffer. Therefore, no selection between a register file value and a value provided from the reorder buffer need be made. In fact, the register file may be eliminated from a microprocessor employing the reorder buffer. Since the storage locations and related circuitry for the committed register states are included within the same block, interconnect delays may be reduced.

The retired storage section comprises a shiftable queue in one embodiment. The shiftable queue stores committed register states and indications of the architected registers corresponding to the committed register states. As new committed register states are moved into the retired storage section, committed register states are shifted within the shiftable queue such that the old committed register states corresponding to the architected registers updated by the new committed register states are discarded. The new committed register states are stored into the head of the queue. As opposed to a static correlation between retired storage section storage locations and architected registers, a dynamic assignment of storage locations to architected registers is maintained. Generally, any storage location within the retired storage section may be associated within any architected register in any given clock cycle.

Broadly speaking, the present invention contemplates a reorder buffer comprising a speculative storage section, a retired storage section, and a control unit. The speculative storage section is configured to store speculative register states; while the retired storage section is configured to store committed register states. Coupled to the speculative storage section and the retired storage section, the control unit selects a particular speculative register state for storage as a particular committed register state upon retirement of a corresponding instruction which generated the particular speculative register state.

The present invention further contemplates a method for operating a reorder buffer. An instruction execution result corresponding to an instruction is stored into a speculative storage section of the reorder buffer. The instruction is selected for retirement. Upon selection of the instruction for retirement, the instruction execution result is moved into a retirement section of the reorder buffer.

The present invention still further contemplates a microprocessor comprising a plurality of functional units and a reorder buffer coupled thereto. The functional units are configured to execute instructions and provide corresponding instruction execution results to the reorder buffer. The reorder buffer is configured to receive the instruction execution results from the functional units. Additionally, the reorder buffer is configured to maintain the instruction execution results as speculative instruction execution results until the instructions are retired. The reorder buffer maintains a particular instruction execution result as a committed instruction execution result upon retirement of a corresponding instruction until a subsequent instruction which updates a register updated by the committed instruction execution result is retired.

BRIEF DESCRIPTION OF THE DRAWINGS

Other objects and advantages of the invention will become apparent upon reading the following detailed description and upon reference to the accompanying drawings in which:

FIG. 6 is an example of update off the second embodiment of the retired section.

Figure 1:
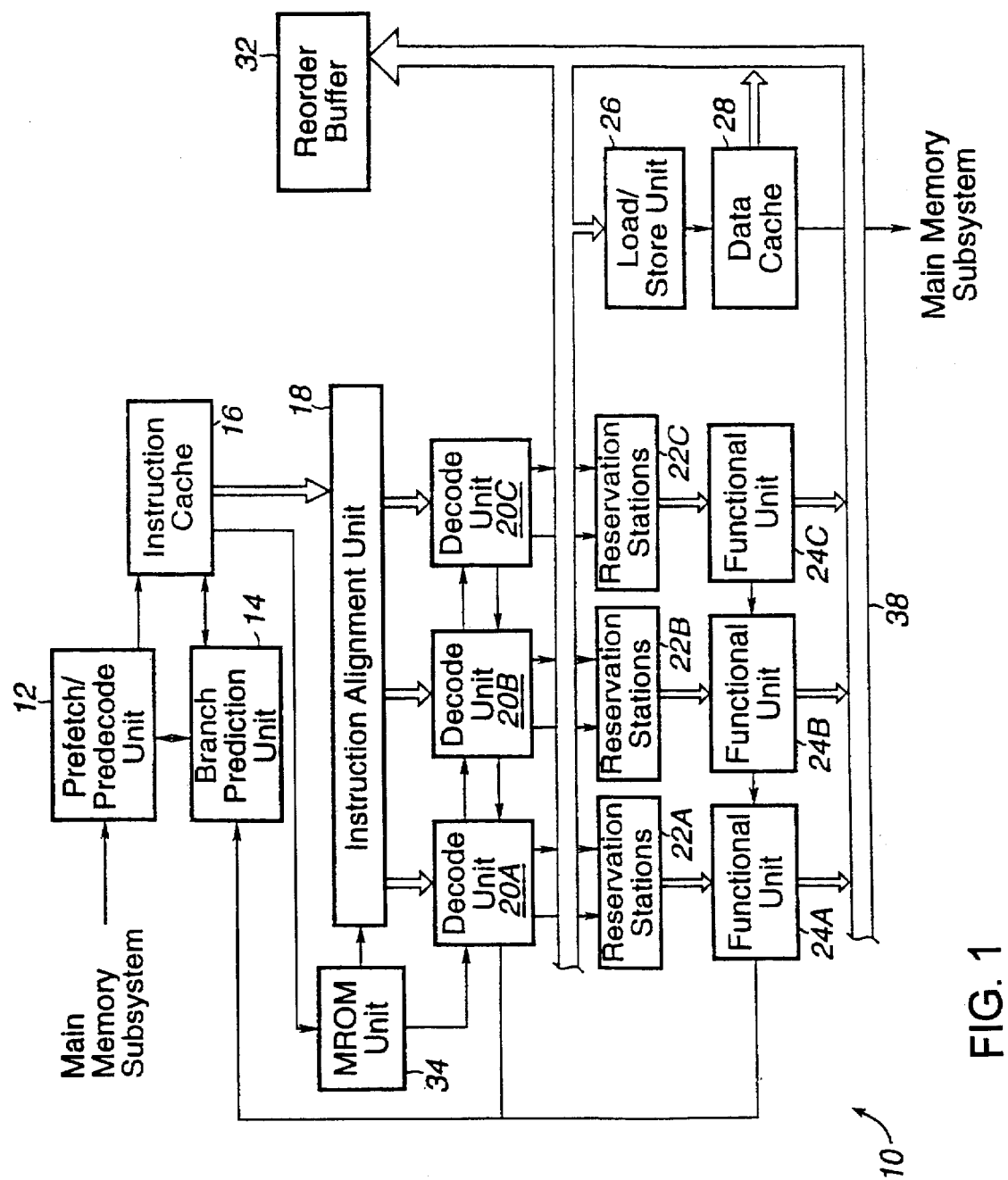
FIG. 1 is a block diagram of one embodiment of a superscalar microprocessor.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Turning now to FIG. 1, a block diagram of one embodiment of a microprocessor 10 is shown. Microprocessor 10 includes a prefetch/predecode unit 12, a branch prediction unit 14, an instruction cache 16, an instruction alignment unit 18, a plurality of decode units 20A–20C, a plurality of reservation stations 22A–22C, a plurality of functional units 24A–24C, a load/store unit 26, a data cache 28, a reorder buffer 32, and an MROM unit 34. Elements referred to herein with a particular reference number followed by a letter will be collectively referred to by the reference number alone. For example, decode units 20A–20C will be collectively referred to as decode units 20.

Prefetch/predecode unit 12 is coupled to receive instructions from a main memory subsystem (not shown), and is further coupled to instruction cache 16 and branch prediction unit 14. Similarly, branch prediction unit 14 is coupled to instruction cache 16. Still further, branch prediction unit 14 is coupled to decode units 20 and functional units 24. Instruction cache 16 is further coupled to MROM unit 34 and instruction alignment unit 18. Instruction alignment unit 18 is in turn coupled to decode units 20. Each decode unit 20A–20C is coupled to load/store unit 26 and to respective reservation stations 22A–22C. Reservation stations 22A–22C are further coupled to respective functional units 24A–24C. Additionally, decode units 20 and reservation stations 22 are coupled to reorder buffer 32. Functional units 24 are coupled to load/store unit 26 and reorder buffer 32 as well. Data cache 28 is coupled to load/store unit 26 and to the main memory subsystem. Finally, MROM unit 34 is coupled to decode units 20.

Generally speaking, reorder buffer 32 is configured to store both speculative register states as well as committed register states. The speculative register states correspond to instructions speculatively dispatched and executed by microprocessor 10. Conversely, the committed register states reflect the execution of the instructions which have been retired by reorder buffer 32. Reorder buffer 32 performs dependency checking upon the speculative register states and the committed register states in response to operand requests received from decode units 20. Since a committed register state is maintained within the reorder buffer for each architected register, a "dependency" is detected for each register operand. However, committed register states are always values, not reorder buffer tags. A speculative register state may not yet be provided via execution of the corresponding instruction, so a reorder buffer tag may be forwarded if the dependency is detected upon a speculative register state. Advantageously, reservation stations 22 receive a reorder buffer tag or register value from reorder buffer 32 for every register operand. The functional unit need not select between the value provided by a reorder buffer or the value provided by a register file. Alternatively, a selection between a register value and a value from the reorder buffer need not be performed within reorder buffer 32. Because the register file is eliminated, timing problems within the register file for reading and writing the same entry are similarly eliminated. Still further, since the committed register states are stored within the reorder buffer along with the speculative register states, the interconnect delay often associated with the separate reorder buffer/register file combination may be eliminated.

Reorder buffer 32 includes a speculative storage section and a retired storage section. The retired storage section stores the committed register states corresponding to each architected register. The speculative storage section stores zero or more speculative register states corresponding to each architected register. As a particular instruction which updates an architected register is retired, the speculative register state associated therewith is moved into the retired storage section, replacing the previous committed register state for the architected register updated by the instruction. It is noted that the term "register" when used with respect to instructions, instruction execution results, speculative register states, and committed register states is intended to mean "architected register".

In one embodiment, the retired register storage operates as a shiftable queue in which new committed register states are added at the head of the queue and other committed register states are shifted down the queue until the previous committed register state for the register being updated is encountered. Entries beyond the previous committed state within the queue are not shifted, thereby deleting the previous committed register state from the retired register storage. Fixed locations are not assigned to each architected register. Instead, an indication of which register corresponds to a particular committed register state is stored along with the particular committed register state. The indication is used both for dependency checking and for updating the retired register storage when instructions are retired.

Instruction cache 16 is a high speed cache memory provided to store instructions. Instructions are fetched from instruction cache 16 and dispatched to decode units 20. In one embodiment, instruction cache 16 is configured to store up to 32 kilobytes of instructions in an 8 way set associative structure having 32 byte lines (a byte comprises 8 binary bits). Instruction cache 16 may additionally employ a way prediction scheme in order to speed access times to the instruction cache. Instead of accessing tags identifying each line of instructions and comparing the tags to the fetch address to select a way, instruction cache 16 predicts the way that is accessed. In this manner, the way is selected prior to accessing the instruction storage. The access time of instruction cache 16 may be similar to a direct-mapped cache. A tag comparison is performed and, if the way prediction is incorrect, the correct instructions are fetched and the incorrect instructions are discarded. It is noted that instruction cache 16 may be implemented as a fully associative, set associative, or direct mapped configuration.

Instructions are fetched from main memory and stored into instruction cache 16 by prefetch/predecode unit 12. Instructions may be prefetched prior to instruction cache 16 recording a miss for the instructions in accordance with a prefetch scheme. A variety of prefetch schemes may be employed by prefetch/predecode unit 12. As prefetch/predecode unit 12 transfers instructions from main memory to instruction cache 16, prefetch/predecode unit 12 generates three predecode bits for each byte of the instructions: a start bit, an end bit, and a functional bit. The predecode bits form tags indicative of the boundaries of each instruction. The predecode tags may also convey additional information such as whether a given instruction can be decoded directly by decode units 20 or whether the instruction is executed by invoking a microcode procedure controlled by MROM unit 34, as will be described in greater detail below. Still further, prefetch/predecode unit 12 may be configured to detect branch instructions and to store branch prediction information corresponding to the branch instructions into branch prediction unit 14.

One encoding of the predecode tags for an embodiment of microprocessor 10 employing the x86 instruction set will next be described. If a given byte is the first byte of an instruction, the start bit for that byte is set. If the byte is the last byte of an instruction, the end bit for that byte is set. Instructions which may be directly decoded by decode units 20 are referred to as "fast path" instructions. The remaining x86 instructions are referred to as MROM instructions, according to one embodiment. For fast path instructions, the functional bit is set for each prefix byte included in the instruction, and cleared for other bytes. Alternatively, for MROM instructions, the functional bit is cleared for each prefix byte and set for other bytes. The type of instruction may be determined by examining the functional bit corresponding to the end byte. If that functional bit is clear, the instruction is a fast path instruction. Conversely, if that functional bit is set, the instruction is an MROM instruction. The opcode of an instruction may thereby be located within an instruction which may be directly decoded by decode units 20 as the byte associated with the first clear functional bit in the instruction. For example, a fast path instruction including two prefix bytes, a Mod R/M byte, and an SIB byte would have start, end, and functional bits as follows:

| | |
|---|---|
| Start bits | 10000 |
| End bits | 00001 |
| Functional bits | 11000 |

MROM instructions are instructions which are determined to be too complex for decode by decode units 20. MROM instructions are executed by invoking MROM unit 34. More specifically, when an MROM instruction is encountered, NROM unit 34 parses and issues the instruction into a subset of defined fast path instructions to effectuate the desired operation. MROM unit 34 dispatches the subset of fast path instructions to decode units 20. A listing of exemplary x86 instructions categorized as fast path instructions will be provided further below.

Microprocessor 10 employs branch prediction in order to speculatively fetch instructions subsequent to conditional branch instructions. Branch prediction unit 14 is included to perform branch prediction operations. In one embodiment, up to two branch target addresses are stored with respect to each cache line in instruction cache 16. Prefetch/predecode unit 12 determines initial branch targets when a particular line is predecoded. Subsequent updates to the branch targets corresponding to a cache line may occur due to the execution of instructions within the cache line. Instruction cache 16 provides an indication of the instruction address being fetched, so that branch prediction unit 14 may determine which branch target addresses to select for forming a branch prediction. Decode units 20 and functional units 24 provide update information to branch prediction unit 14. Because branch prediction unit 14 stores two targets per cache line, some branch instructions within the line may not be stored in branch prediction unit 14. Decode units 20 detect branch instructions which were not predicted by branch prediction unit 14. Functional units 24 execute the branch instructions and determine if the predicted branch direction is incorrect. The branch direction may be "taken", in which subsequent instructions are fetched from the target address of the branch instruction. Conversely, the branch direction may be "not taken", in which subsequent instructions are fetched from memory locations consecutive to the branch instruction. When a mispredicted branch instruction is detected, instructions subsequent to the mispredicted branch are discarded from the various units of microprocessor 10. A variety of suitable branch prediction algorithms may be employed by branch prediction unit 14.

Instructions fetched from instruction cache 16 are conveyed to instruction alignment unit 18. As instructions are fetched from instruction cache 16, the corresponding predecode data is scanned to provide information to instruction alignment unit 18 (and to MROM unit 34) regarding the instructions being fetched. Instruction alignment unit 18 utilizes the scanning data to align an instruction to each of decode units 20. In one embodiment, instruction alignment unit 18 aligns instructions from three sets of eight instruction bytes to decode units 20. Instructions are selected independently from each set of eight instruction bytes into preliminary issue positions. The preliminary issue positions are then merged to a set of aligned issue positions corresponding to decode units 20, such that the aligned issue positions contain the three instructions which are prior to other instructions within the preliminary issue positions in program order. Decode unit 20A receives an instruction which is prior to instructions concurrently received by decode units 20B and 20C (in program order). Similarly, decode unit 20B receives an instruction which is prior to the instruction concurrently received by decode unit 20C in program order.

Decode units 20 are configured to decode instructions received from instruction alignment unit 18. Register operand information is detected and routed to reorder buffer 32. Additionally, if the instructions require one or more memory operations to be performed, decode units 20 dispatch the memory operations to load/store unit 26. Each instruction is decoded into a set of control values for functional units 24, and these control values are dispatched to reservation stations 22 along with operand address information and displacement or immediate data which may be included with the instruction.

Microprocessor 10 supports out of order execution, and thus employs reorder buffer 32 to keep track of the original program sequence for register read and write operations, to implement register renaming, to allow for speculative instruction execution and branch misprediction recovery, and to facilitate precise exceptions. A temporary storage location within reorder buffer 32 is reserved upon decode of an instruction that involves the update of a register to thereby store speculative register states. If a branch prediction is incorrect, the results of speculatively-executed instructions along the mispredicted path can be invalidated in the buffer. Similarly, if a particular instruction causes an exception, instructions subsequent to the particular instruction may be discarded. In this manner, exceptions are "precise" (i.e. instructions subsequent to the particular instruction causing the exception are not completed prior to the exception).

The instruction control values and immediate or displacement data provided at the outputs of decode units 20 are routed directly to respective reservation stations 22. In one embodiment, each reservation station 22 is capable of holding instruction information (i.e., instruction control values as well as operand values, operand tags and/or immediate data) for up to three pending instructions awaiting issue to the corresponding functional unit. It is noted that for the embodiment of FIG. 1, each reservation station 22 is associated with a dedicated functional unit 24. Accordingly, three dedicated "issue positions" are formed by reservation stations 22 and functional units 24. In other words, issue position 0 is formed by reservation station 22A and functional unit 24A. Instructions aligned and dispatched to reservation station 22A are executed by functional unit 24A. Similarly, issue position 1 is formed by reservation station 22B and functional unit 24B; and issue position 2 is formed by reservation station 22C and functional unit 24C.

Upon decode of a particular instruction, if a required operand is a register location, register address information is routed to reorder buffer 32. Those of skill in the art will appreciate that the x86 architected register set includes eight 32 bit real registers (i.e., typically referred to as EAX, EBX, ECX, EDX, EBP, ESI, EDI and ESP). Reorder buffer 32 contains temporary storage locations for results which change the contents of these registers to thereby allow out of order execution. A temporary storage location of reorder buffer 32 is reserved for each instruction which, upon decode, is determined to modify the contents of one of the real registers. Therefore, at various points during execution of a particular program, reorder buffer 32 may have one or more locations which contain the speculatively executed contents of a given register. Additionally, reorder buffer 32 includes storage locations for the committed register states corresponding to each register as a result of instructions which have been retired. Following decode of a given instruction, reorder buffer 32 forwards to the corresponding reservation station either: 1) the value in the most recently assigned location, or 2) a tag for the most recently assigned location if the value has not yet been produced by the functional unit that will eventually execute the previous instruction. If the operand corresponds to a memory location, the operand value is provided to the reservation station through load/store unit 26.

In one particular embodiment, reorder buffer 32 is configured to store and manipulate concurrently decoded instructions as a unit. This configuration will be referred to herein as "line-oriented". By manipulating several instructions together, the hardware employed within reorder buffer 32 may be simplified. For example, a line-oriented reorder buffer included in the present embodiment allocates storage sufficient for instruction information pertaining to three instructions (one from each decode unit 20) whenever one or more instructions are dispatched by decode units 20. By contrast, a variable amount of storage is allocated in conventional reorder buffers, dependent upon the number of instructions actually dispatched. A comparatively larger number of logic gates may be required to allocate the variable amount of storage. When each of the concurrently decoded instructions has executed, the instruction results are retired simultaneously. The storage is then free for allocation to another set of concurrently decoded instructions. Additionally, the amount of control logic circuitry employed per instruction is reduced because the control logic is amortized over several concurrently decoded instructions. A reorder buffer tag identifying a particular instruction may be divided into two fields: a line tag and an offset tag. The line tag identifies the set of concurrently decoded instructions including the particular instruction, and the offset tag identifies which instruction within the set corresponds to the particular instruction. It is noted that any reorder buffer configuration may be employed in various embodiments of microprocessor 10.

As noted earlier, reservation stations 22 store instructions until the instructions are executed by the corresponding functional unit 24. An instruction is selected for execution if: (i) the operands of the instruction have been provided; and (ii) the operands have not yet been provided for instructions which are within the same reservation station 22A–22C and which are prior to the instruction in program order. It is noted that when an instruction is executed by one of the functional units 24, the result of that instruction is passed directly to any reservation stations 22 that are waiting for that result at the same time the result is passed to update reorder buffer 32 (this technique is commonly referred to as "result forwarding"). An instruction may be selected for execution and passed to a functional unit 24A–24C during the clock cycle that the associated result is forwarded. Reservation stations 22 route the forwarded result to the functional unit 24 in this case.

In one embodiment, each of the functional units 24 is configured to perform integer arithmetic operations of addition and subtraction, as well as shifts, rotates, logical operations, and branch operations. The operations are performed in response to the control values decoded for a particular instruction by decode units 20. It is noted that a floating point unit (not shown) may also be employed to accommodate floating point operations. The floating point unit may be operated as a coprocessor, receiving instructions from MROM unit 34 and subsequently communicating with reorder buffer 32 to complete the instructions. Additionally, functional units 24 may be configured to perform address generation for load and store memory operations performed by load/store unit 26.

Each of the functional units 24 also provides information regarding the execution of conditional branch instructions to the branch prediction unit 14. If a branch prediction was incorrect, branch prediction unit 14 flushes instructions subsequent to the mispredicted branch that have entered the instruction processing pipeline, and causes fetch of the required instructions from instruction cache 16 or main memory. It is noted that in such situations, results of instructions in the original program sequence which occur after the mispredicted branch instruction are discarded, including those which were speculatively executed and temporarily stored in load/store unit 26 and reorder buffer 32.

Results produced by functional units 24 are sent to reorder buffer 32 if a register value is being updated, and to load/store unit 26 if the contents of a memory location are changed. If the result is to be stored in a register, reorder buffer 32 stores the result in the location reserved for the value of the register when the instruction was decoded. A plurality of result buses 38 are included for forwarding of results from functional units 24 and load/store unit 26. Result buses 38 convey the result generated, as well as the reorder buffer tag identifying the instruction being executed.

Load/store unit 26 provides an interface between functional units 24 and data cache 28. In one embodiment, load/store unit 26 is configured with a load/store buffer having eight storage locations for data and address information for pending loads or stores. Decode units 20 arbitrate for access to the load/store unit 26. When the buffer is full, a decode unit must wait until load/store unit 26 has room for the pending load or store request information. Load/store unit 26 also performs dependency checking for load memory operations against pending store memory operations to ensure that data coherency is maintained. A memory operation is a transfer of data between microprocessor 10 and the main memory subsystem. Memory operations may be the result of an instruction which utilizes an operand stored in memory, or may be the result of a load/store instruction which causes the data transfer but no other operation. Additionally, load/store unit 26 may include a special register storage for special registers such as the segment registers and other registers related to the address translation mechanism defined by the x86 microprocessor architecture.

In one embodiment, load/store unit 26 is configured to perform load memory operations speculatively. Store memory operations are performed in program order, but may be speculatively stored into the predicted way. If the predicted way is incorrect, the data prior to the store memory operation is subsequently restored to the predicted way and the store memory operation is performed to the correct way. In another embodiment, stores may be executed speculatively as well. Speculatively executed stores are placed into a store buffer, along with a copy of the cache line prior to the update. If the speculatively executed store is later discarded due to branch misprediction or exception, the cache line may be restored to the value stored in the buffer. It is noted that load/store unit 26 may be configured to perform any amount of speculative execution, including no speculative execution.

Data cache 28 is a high speed cache memory provided to temporarily store data being transferred between load/store unit 26 and the main memory subsystem. In one embodiment, data cache 28 has a capacity of storing up to sixteen kilobytes of data in an eight way set associative structure. Similar to instruction cache 16, data cache 28 may employ a way prediction mechanism. It is understood that data cache 28 may be implemented in a variety of specific memory configurations, including a set associative configuration.

In one particular embodiment of microprocessor 10 employing the x86 microprocessor architecture, instruction cache 16 and data cache 28 are linearly addressed. The linear address is formed from the offset specified by the instruction and the base address specified by the segment portion of the x86 address translation mechanism. Linear addresses may optionally be translated to physical addresses for accessing a main memory. The linear to physical translation is specified by the paging portion of the x86 address translation mechanism. It is noted that a linear addressed cache stores linear address tags. A set of physical tags (not shown) may be employed for mapping the linear addresses to physical addresses and for detecting translation aliases. Additionally, the physical tag block may perform linear to physical address translation.

Figure 2:
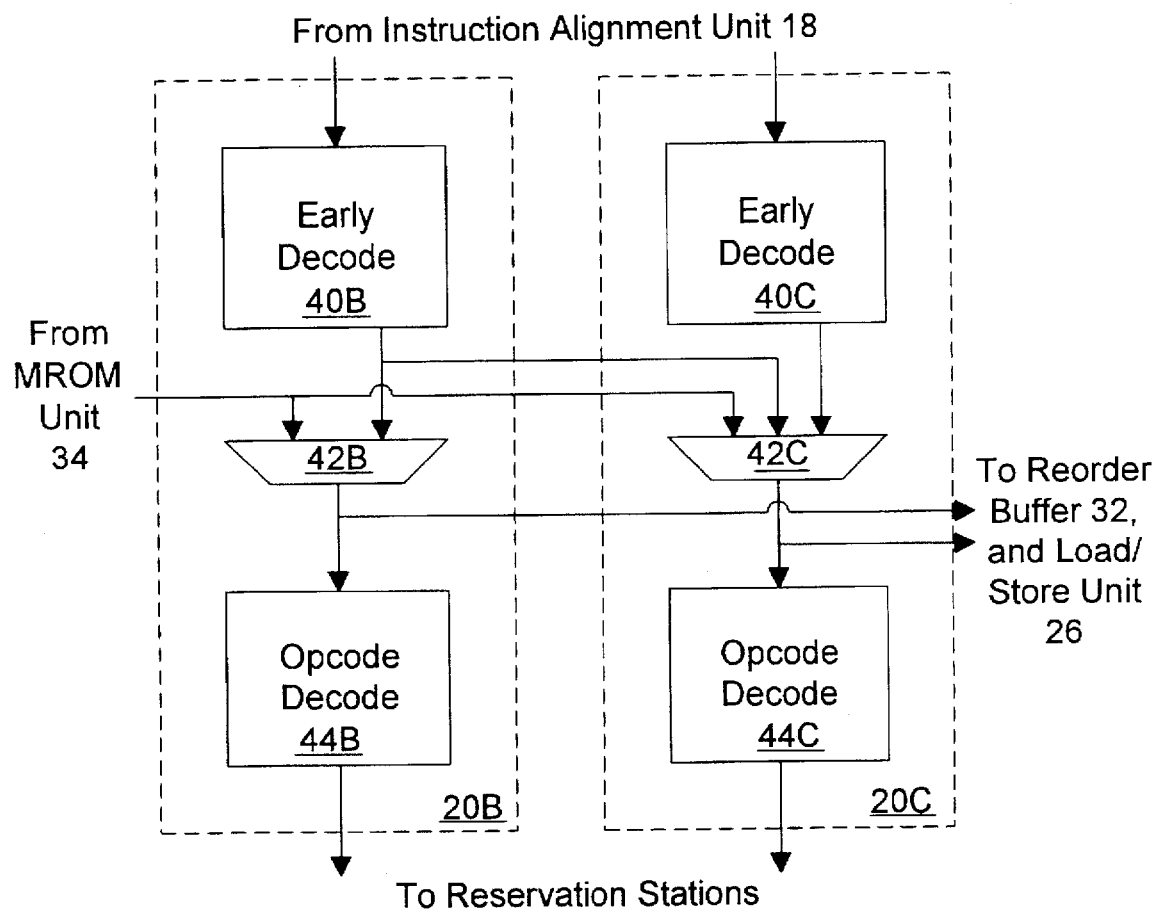
FIG. 2 is a block diagram of one embodiment of a pair of decode units shown in FIG. 1.

Turning now to FIG. 2, a block diagram of one embodiment of decode units 20B and 20C are shown. Each decode unit 20 receives an instruction from instruction alignment unit 18. Additionally, MROM unit 34 is coupled to each decode unit 20 for dispatching fast path instructions corresponding to a particular MROM instruction. Decode unit 20B comprises early decode unit 40B, multiplexor 42B, and opcode decode unit 44B. Similarly, decode unit 20C includes early decode unit 40C, multiplexor 42C, and opcode decode unit 44C.

Certain instructions in the x86 instruction set are both fairly complicated and frequently used. In one embodiment of microprocessor 10, such instructions include more complex operations than the hardware included within a particular functional unit 24A–24C is configured to perform. Such instructions are classified as a special type of MROM instruction referred to as a "double dispatch" instruction. These instructions are dispatched to a pair of opcode decode units 44. It is noted that opcode decode units 44 are coupled to respective reservation stations 22. Each of opcode decode units 44A–44C forms an issue position with the corresponding reservation station 22A–22C and functional unit 24A–24C. Instructions are passed from an opcode decode unit 44 to the corresponding reservation station 22 and further to the corresponding functional unit 24.

Multiplexer 42B is included for selecting between the instructions provided by MROM unit 34 and by early decode unit 40B. During times in which MROM unit 34 is dispatching instructions, multiplexer 42B selects instructions provided by MROM unit 34. At other times, multiplexor 42B selects instructions provided by early decode unit 40B. Similarly, multiplexer 42C selects between instructions provided by MROM unit 34, early decode unit 40B, and early decode unit 40C. The instruction from MROM unit 34 is selected during times in which MROM unit 34 is dispatching instructions. During times in which early decode unit 40A detects a double dispatch instruction, the instruction from early decode unit 40B is selected by multiplexer 42C. Otherwise, the instruction from early decode unit 40C is selected. Selecting the instruction from early decode unit 40B into opcode decode unit 44C allows a fast path instruction decoded by decode unit 20B to be dispatched concurrently with a double dispatch instruction decoded by decode unit 20A.

According to one embodiment employing the x86 instruction set, early decode units 40 perform the following operations:

(i) merge the prefix bytes of the instruction into an encoded prefix byte;

(ii) decode unconditional branch instructions (which may include the unconditional jump, the CALL, and the RETURN) which were not detected during branch prediction;

(iii) decode source and destination flags;

(iv) decode the source and destination operands which are register operands and generate operand size information; and (v) determine the displacement and/or immediate size so that displacement and immediate data may be routed to the opcode decode unit.

Opcode decode units 44 are configured to decode the opcode of the instruction, producing control values for functional unit 24. Displacement and immediate data are routed with the control values to reservation stations 22.

Since early decode units 40 detect operands, the outputs of multiplexors 42 are routed to reorder buffer 32. Operand values or tags may thereby be routed to reservation stations 22. Additionally, memory operands are detected by early decode units 40. Therefore, the outputs of multiplexors 42 are routed to load/store unit 26. Memory operations corresponding to instructions having memory operands are stored by load/store unit 26.

Figure 3:
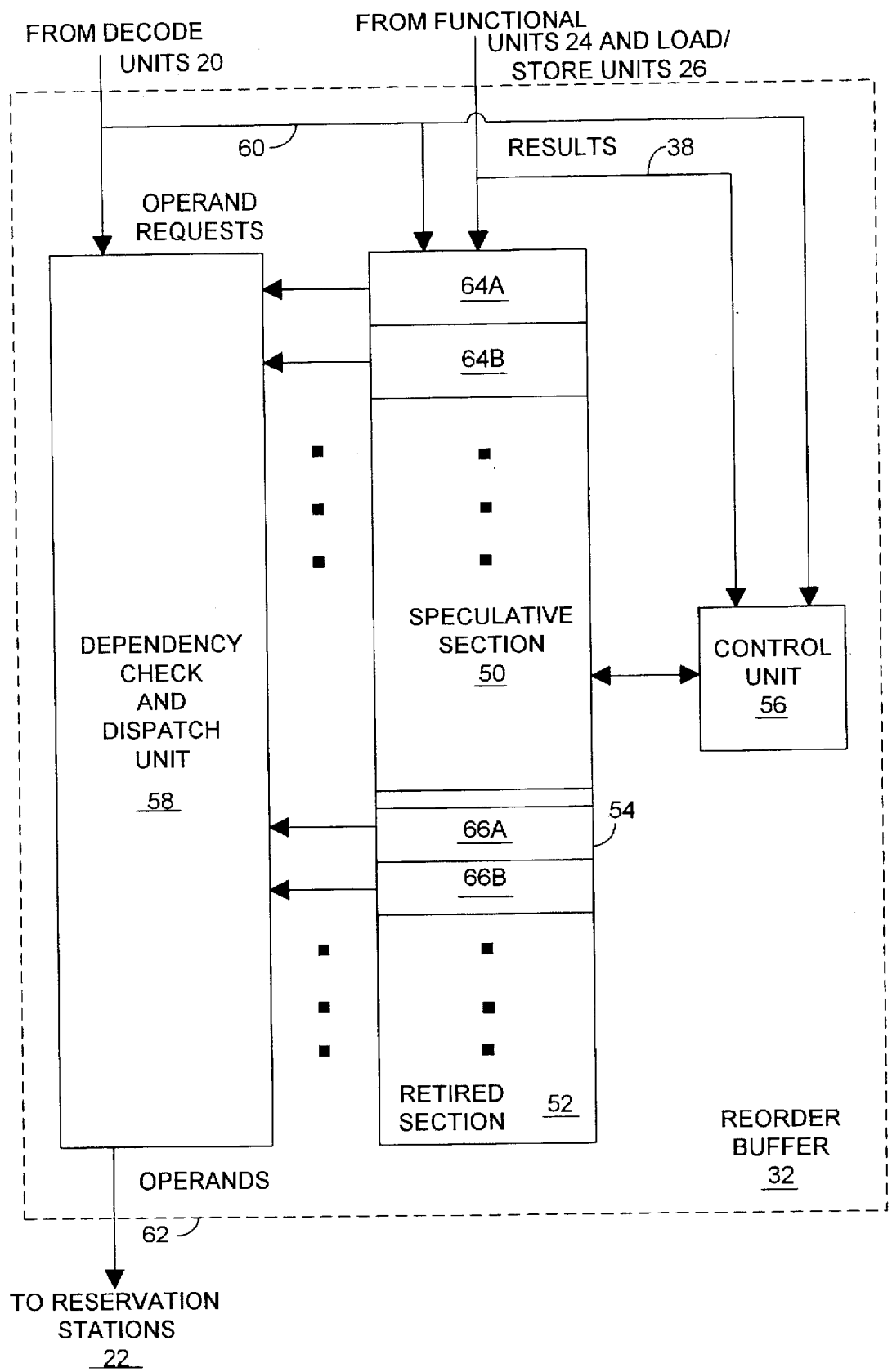
FIG. 3 is a block diagram of one embodiment of a reorder buffer shown in FIG. 1, including a retired section.

Turning now to FIG. 3, a block diagram of one embodiment of reorder buffer 32 is shown. Other embodiments are contemplated. As shown in FIG. 3, reorder buffer 32 includes a speculative storage section 50 and a retired storage section 52 within a reorder buffer storage 54. Additionally, reorder buffer 32 includes a control unit 56 and a dependency check and dispatch unit ("dispatch unit") 58. Reorder buffer storage 54, dispatch unit 58, and control unit 56 are coupled to an operand requests bus 60 from decode units 20. Additionally, dispatch unit 58 conveys operands to reservation stations 22 upon an operands bus 62. Additionally, reorder buffer storage 54 and control unit 56 are coupled to results buses 38 from functional units 24 and load/store unit 28. Furthermore, control unit 56 is coupled to reorder buffer storage 54. Dispatch unit 58 is coupled to reorder buffer storage 54 as well.

As instructions are decoded by decode units 20, operand requests are conveyed to reorder buffer 32 for each register source operand used by the instructions being decoded. Operand requests bus 60 includes lines from each decode unit 20A–20B for each possible source operand of an instruction. For example, instructions within the x86 microprocessor architecture which are characterized as fast path instructions may have up to two register source operands (one of which may also be the destination of the instruction). Therefore, operand requests bus 60 includes lines from each decode unit 20 to indicate two source register operands for such an embodiment.

Dispatch unit 58 compares the register source operands of each instruction to the register destinations stored in reorder buffer storage 54. Since reorder buffer storage 54 includes retired storage section 52, which includes storage locations 66 (such as storage locations 66A–66B shown in FIG. 3) which store a value for each architected register, dispatch unit 58 detects at least a "dependency" upon an entry within retired storage section 52. Furthermore, dispatch unit 58 may detect one or more dependencies upon entries within speculative storage section 50. If a dependency is detected within speculative storage section 50, that dependency supersedes a dependency within retired storage section 52. If multiple dependencies are detected within speculative storage section 50, then the speculative register state (or reorder buffer tag) corresponding to the most recently dispatched instruction (in program order) is provided. Dispatch unit 58 conveys the corresponding register state or reorder buffer tag upon operands bus 62 to reservation stations 22. Operands bus 62 includes lines for transmitting reorder buffer tags and register values for each operand request which may be conveyed upon operand requests bus 60.

Generally, dispatch unit 58 considers reorder buffer storage 54 as one storage of instructions and makes no distinction between speculative storage section 50 and retired storage section 52. The dependencies detected in retired storage section 52 always result in a register value (as opposed to a reorder buffer tag) being provided upon operands bus 62 since the register value is always valid. Additionally, the program order of the committed register states is prior to any speculative register states stored in speculative section 50.

Control unit 56 receives the operand requests as well, and allocates a storage location or locations (such as storage locations 64A and 64B) within speculative storage section 50 for instructions being dispatched during a clock cycle. Although any configuration may be used, speculative storage section 50 may be configured in the line-oriented fashion described above in one embodiment. In such an embodiment, control unit 56 allocates a line of storage within speculative storage section 50 during any clock cycle in which at least one instruction is dispatched. Speculative storage section 50 stores an indication of the destination register (provided upon operand requests bus 60). Additionally, speculative storage section 50 includes storage for the corresponding instruction execution result (when provided). The instruction execution result comprises the speculative register state while the result remains stored within speculative storage section 50. If the instruction is subsequently retired by control unit 56, the instruction execution result becomes the committed register state until a subsequent instruction which updates the same architected register is retired. It is noted that additional information may be stored with respect to each instruction within speculative storage section 50. For example, an indication of the instruction type may be stored, as well as whether or not the instruction may cause an exception or branch misprediction, etc. Such information is provided by decode units 20 and stored into the allocated storage location 64 within speculative storage section 50.

Instruction execution results are provided by functional units 24 (and by load/store unit 26 for memory operations) upon result buses 38. Result buses 38 convey the reorder buffer tag as well as the instruction execution result. Control unit 56 examines the reorder buffer tag to determine the storage location 64 within speculative storage section 50 which corresponds to the reorder buffer tag. Control unit 56 then directs the storage location 64 to store the instruction execution result.

Result buses 38 further convey information regarding branch misprediction and exception results for a given instruction. If a branch misprediction or exception is detected, instructions which are subsequent to the mispredicted branch instruction or exception-causing instruction are discarded from speculative storage section 50. Additionally, instruction cache 16 is informed of the misprediction/exception and is directed to begin fetching instructions from the corrected instruction stream. The discarded instructions resided within the incorrectly predicted instruction stream originally fetched by microprocessor 10. It is noted that retired storage section 52 does not experience discarding of results, since retired storage section 52 stores committed register states which are not subject to discard due to branch misprediction or exception. Various branch misprediction recovery/exception recovery mechanisms are well known and may be suitable for use by control unit 56 in discarding instructions and otherwise recovering from mispredictions and exceptions.

Control unit 56 is further configured to select instructions from speculative storage section 50 for retirement. In the present embodiment, control unit 56 retires instructions in program order. A particular instruction, although having been executed and instruction execution result provided to reorder buffer 32, may remain stored in speculative storage section 50 until instructions prior to the particular instruction have executed and provided instruction execution results. The instructions which are prior to the particular instruction may include a branch instruction or an instruction which causes an exception, causing the particular instruction to be discarded. Control unit 56 may be configured to retire multiple instructions during a clock cycle, by examining the instructions which are foremost in program order among the instructions represented within speculative storage section 50 (i.e. the "oldest" instructions). For example, control unit 56 may be configured to retire up to the three oldest instructions within speculative storage section 50. The oldest instruction is retired if it has been executed and the instruction execution result has been provided to reorder buffer 32. The second oldest instruction is retired if it has been executed and the instruction execution result has been provided to reorder buffer 32; and the oldest instruction has been executed and did not result in a branch misprediction or exception. Similarly, the third oldest instruction may be retired if it has been executed and a corresponding instruction execution result has been provided; and both the oldest and second oldest instructions have been executed and did not result in branch misprediction or exception.

In an alternative embodiment, reorder buffer 32 may be configured to perform out of order retirement of instructions. An instruction may be retired out of order with previous instructions if the instructions are known (via their definition in the microprocessor architecture employed by microprocessor 10) to not cause exception or branch misprediction. Furthermore, the prior instructions must not update the same architected register as the instruction being considered for out of order retirement. Other out of order retirement schemes may be employed as well. Generally, a particular instruction is eligible for retirement in the present embodiment if it has executed and provided an instruction execution result to reorder buffer 32, and instructions prior to the particular instruction do not cause an exception or branch misprediction (either by definition or by execution without generating such an event).

Instruction execution results corresponding to instructions being retire d are moved into retired storage section 52. The instruction execution results thereby become committed register states, replacing the previously stored committed register states corresponding to the registers updated by the instructions being retired. The mechanism employed by retired storage section 52 for replacing previous committed register states with newly retired committed register states is explained in more detail below. It is noted that, if more than one concurrently retired instruction updates a particular architected register, the instruction execution result corresponding to the last instruction in program order of the concurrently retired instructions becomes the committed register state. In embodiments in which speculative storage section 50 is configured in a line oriented fashion, a set of last-in-line (LIL) bits may be stored. The LIL bits indicate which instructions are the last in a given line to update each register updated by the line. Since the line-oriented structure retires instructions within a line simultaneously and retires at most one line in a given clock cycle, the last in line bits may be used to determine the number of registers updated by the line of instructions.

It is further noted that, in order to simplify the prioritizing of multiple dependencies detected within speculative storage section 50 and retired storage section 52, a set of last-in-buffer (LIB) bits may be stored to indicate which update of a particular register is the last (in program order) within reorder buffer 32 to update a given architected register. The storage location 64 or 66 which has the LIB bit set is the location storing the most recent (in program order) update of the register. The LIB bits may be included in the dependency comparison such that the most recent update of the register is the only one detected as a dependency. Furthermore, the comparisons can be used to update the LIB bits with respect to new instructions being dispatched, since the x86 microprocessor architecture specifies that destination registers are also source operands for an instruction. In other words, a comparison with a destination/source register of an instruction being dispatched indicating equality with a register field 86 causes the LIB bit of the storage location 64 or 66 to be reset. The LIB bits are also recovered upon branch misprediction/exception by "redispatching" the instructions prior to the mispredicted branch or exception causing instruction through dispatch unit 58. Operands bus 62 is not activated during "redispatching", but the LIB bits may be recovered with respect to the discarded instructions through the comparison of destination registers performed by dispatch unit 58.

It is noted that speculative storage section 50 may be implemented in a variety of fashions. For example, speculative storage section 50 may comprise a first-in, first-out (FIFO) buffer in which instruction execution results are shifted to a bottom of the FIFO buffer as instructions are retired. Alternatively, control unit 56 may maintain head and tail pointer indicating storage locations 64 correspond to the oldest and the most recent instructions, respectively. As instructions are retired, the head pointer may be incremented. As instructions are dispatched, the tail pointer may be incremented. Such a scheme does not shift information between storage locations It is noted that, in one embodiment, storage locations 66 are initialized upon reset to store zero values. One of the storage locations 66 is assigned to each of the architected registers employed by microprocessor 10.

Figure 4:
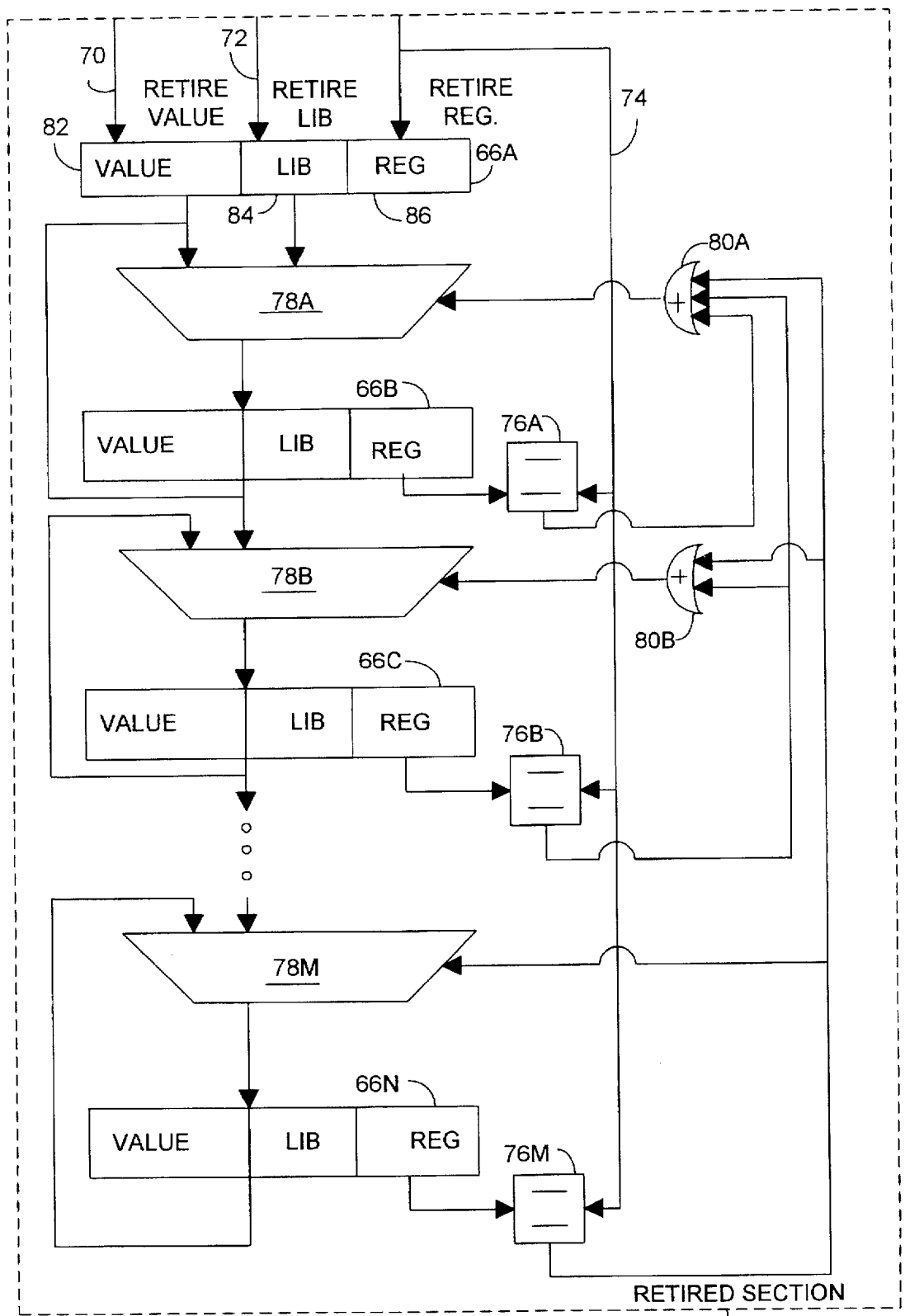
FIG. 4 is a block diagram of one embodiment of the retired section shown in FIG. 3.

Turning now to FIG. 4, a block diagram of one embodiment of retired storage section 52 is shown. The embodiment shown in FIG. 4 is suitable for use with a reorder buffer 32 which retires at most one instruction per clock cycle. Multiple storage locations 66A–66N are shown in FIG. 4. Suitable storage locations may be registers, for example. Storage location 66A is coupled to receive a committed register state from speculative storage section 50 upon a retire value bus 70 as well as corresponding last-in-buffer bits upon a retire LIB bus 72 and a register indicator upon a retire register bus 74. Retire register bus 74 is further coupled to multiple comparator circuits 76A–76M. Comparator circuits 76 are coupled to receive register indicators from respective storage locations 66 as shown in FIG. 4.

Between each of the storage devices 66 is interposed one of multiple multiplexer circuits 78A–78M. Each multiplexor 78A–78M is coupled to receive the contents of the storage location 66A–66N to which it provides an input value as well as the contents of another storage location 66. Multiplexors 78A and 78D receive selection controls from OR gates 80A and 80B, while multiplexor 78M receives a selection control from comparator circuit 76M. It is noted that the number of storage locations 66 included in retired storage section 52 may vary, but is at least equal in number to the number of architected registers specified by the microprocessor architecture employed by microprocessor 10. For example, the x86 microprocessor architecture includes eight architected registers. Therefore, embodiments of microprocessor 10 which employ the x86 microprocessor architecture include at least eight storage locations 66. Each storage location 66A–66N is divided into multiple fields including a value field 82, an LIB field 84, and a register field 86. Value field 82 stores the committed register state, while register field 86 stores the register indicator identifying the register whose value is represented by that committed register state. LIB field 84 stores the LIB bit or bits corresponding to the instruction which produced the committed register state.

The interconnection of storage locations 66 and multiplexors 78 shown in FIG. 4 forms a shiftable queue wherein each storage location 66 is shiftable into one other storage location 66 (except for storage location 66N, which forms the bottom of the queue). The shiftable queue structure is arranged such that the storage locations between storage location 66A and the storage location 66 storing a register indicator which matches (i.e. compares equal to) the register indicator upon retire register bus 74 (inclusive) are shifted down one entry while the storage locations between the matching storage location and storage location 66N are not shifted. In this manner, the previous committed register state representing the register being retired is replaced by the new committed register state provided from speculative storage section 50. Storage locations 66 are therefore dynamically assigned to store a value corresponding to a particular register value. Generally speaking, a shiftable queue structure may allow a shift from one storage location into one or more other storage locations within the structure. Under any given condition, however, a particular storage location is shifted into exactly one other storage location.

Comparator circuits 76 and OR gates 80 provide selection controls to multiplexors 78 in order to operate the shiftable queue as described above. For the embodiment of FIG. 4, a particular storage location 66 accepts the value stored in the storage location 66 which is immediately "upstream" of that particular storage location 66 if the particular storage location 66 or any storage location 66 "downstream" of that particular storage location 66 has a register field 86 storing a register indicator which matches the register indicator provided upon retire register bus 74. The terms "upstream" and "downstream" refer to the direction in which shifting occurs. A first storage location 66 is upstream of a second storage location 66 if the value stored in the first storage location 66 can, via shifting of the shiftable queue, become stored in the second storage location 66. Otherwise, the first storage location 66 is downstream of the second storage location 66.

OR gates 80 detect that a downstream storage location 66 is storing the register being retired by Bring together the output signals of each of the downstream comparator circuits 76 (i.e. comparator circuits 76 which are coupled to downstream storage locations 66) as well as to the storage location 66 for which the selection control is being generated. For example, OR gate 80B receives the outputs of comparator circuits 76B and 76M, as well as other downstream comparator circuits 76 (not shown). The output of OR gate 80B selects multiplexor 78B, which provides the value to be stored in storage location 66C. If the output of OR gate 80B is a logical zero, none of the downstream storage locations 66 nor storage location 66C is storing a value corresponding to the register being updated, so the feedback value from storage location 66C is selected. On the other hand, if the output of OR gate 80B is a logical one, one of the downstream storage locations 66 or storage location 66C is storing the a value corresponding to the register being updated. In this case, the contents of the immediately upstream storage location 66B are selected into storage location 66C.

It is noted that storage location 66A is not coupled to a comparator circuit 76. Since storage location 66A receives the new committed register state from speculative storage section 50, no comparison is needed. If storage location 66A is storing the previous committed register state of the register being updated, then the previous committed register state is simply overwritten. However, if another storage location 66 is storing the previous committed register state, then the contents of storage location 66A are shifted into storage location 66B.

Figure 5:
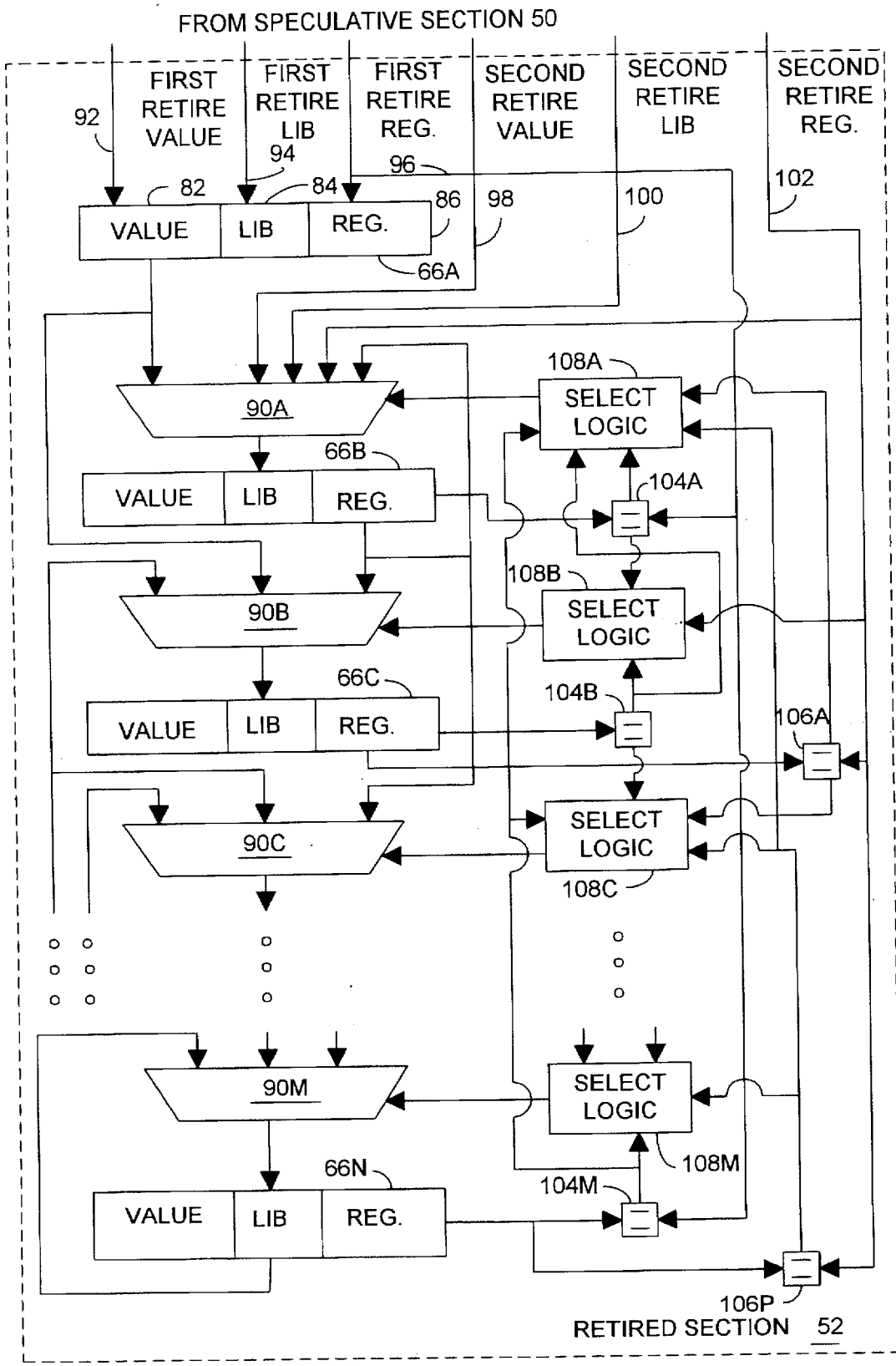
FIG. 5 is a block diagram of a second embodiment of the retired section shown in FIG. 3.

Turning now to FIG. 5, a block diagram of a second embodiment of retired storage section 52 is shown. The embodiment shown in FIG. 5 is suitable for use with a reorder buffer 32 which may retire up to two instructions per clock cycle. Similar to FIG. 4, storage locations 66A–66N are shown having value fields 82, LIB fields 84, and register fields 86. However, where the storage locations 66 shown in FIG. 4 are shiftable to the immediately downstream storage location 66 only, the storage locations 66 shown in FIG. 4 are shiftable to the immediately downstream storage location 66 and to a second downstream storage location 66 (which is two positions downstream) through multiplexors 90A–90M. For example, storage location 66A is coupled to multiplexors 90A and 90B for selection into either storage locations 66B or 66C, depending upon the registers being updated and the previous committed register states corresponding thereto.

As shown in FIG. 5, a first committed register state and related information is conveyed upon a first retire value bus 92, a first retire LIB bus 94, and a first retire register bus 96. Similarly, a second committed register state and related information is conveyed upon a second retire value bus 98, a second retire LIB bus 100, and a second retire register bus 102. The first committed register state is stored into storage location 66A, and the second committed register state is stored into storage location 66B. The diagram of FIG. 5 assumes that, if only one instruction is retired during a clock cycle, first retire value bus 92, first LIB bus 94, and first retire register bus 96 are used to transmit the corresponding committed register state.

A first set of comparator circuits ("first comparator circuits") 104A–104M are coupled to receive the contents of respective register fields 86 and to first retire register bus 96. Similar to comparators 76 in FIG. 4, first comparator circuits 104 are configured to determine if the storage location 66 coupled thereto is storing the register being updated by one of the retiring instructions. A second set of comparator circuits ("second comparator circuits") 106A–106P are coupled to receive the contents of respective register fields 86 and to second retire register bus 102. Second comparator circuits 106 determine if the storage location 66 coupled thereto is storing the register being updated by the other retiring instruction. A first comparator circuit 104 asserts its output signal if the register indicator stored in register field 86 of the storage location 66 coupled thereto matches the register indicator conveyed upon first retire register bus 96. Similarly, a second comparator circuit 106 asserts its output signal if the register indicator stored in register field 86 of the storage location 66 coupled thereto matches the register indicator conveyed upon second retire register bus 102.

Select logic blocks 108A–108M are provided, coupled to provide select signals for multiplexors 90A–90M, respectively. Each select logic block 108 provides selection controls to the corresponding multiplexor 90 such that retired storage section 52 as a whole shifts such that the committed register states being conveyed into retired section 52 replace the previous committed register states for the same registers. In order to correctly shift retired storage section 52, each select logic block 108 receives the output signals from first comparator circuits 104 and second comparator circuits 106 for the immediately upstream storage location, the corresponding storage location itself, and the downstream storage locations. The contents of a storage location 66 may be retained by that storage location 66, be shifted into the immediately downstream storage location 66 or, be shifted into the second downstream storage location 66. For example, the contents of storage location 66A may be retained in storage location 66A, may be shifted into storage location 66B, or may be shifted into storage location 66C.

From another point of view, each storage location 66 may receive its contents for a given clock cycle from itself (via a feedback path through the corresponding multiplexor 90), from the immediately upstream storage location 66, and from the storage location 66 which is two positions upstream). Select logic blocks 108 interpret the comparator signals received therein in order to select the appropriate value for a particular register. In order to explain the operation of select logic blocks 108, select logic block 108B will be used as an example. Select logic block 108B receives the output signals of comparator circuits for storage location 66B (the immediately upstream storage location), storage location 66C (the corresponding storage location to select logic block 108B), and storage locations 66C–66N (the downstream storage locations). Other logic blocks 108C–108M are similar. Logic block 108A is somewhat different, as explained below.

Logic block 108B selects the feedback path from storage location 66C if none of the compare signals (i.e. the output signals from first comparator circuits 104 and second comparator circuits 106) corresponding to downstream storage locations 66 and the compare signals for storage location 66C are asserted. None of these compare signals being asserted indicates that the registers being updated are stored in upstream storage locations. Therefore, storage location 66C is not modified.

Logic block 108B selects the contents of storage location 66B for storage into storage location 66C if one and only one of the compare signals corresponding to downstream storage locations 66 and storage location 66C is asserted, and if the compare signal corresponding to storage location 66B is not asserted. One compare signal being asserted indicates that the committed register state stored in one of the downstream storage locations (or storage location 66C) is being replaced. Therefore, the contents of storage location 66C are being replaced or are being shifted to storage location 66D (not shown) Additionally, the condition that the compare signal corresponding to storage location 66B is not asserted ensures that the contents of storage location 66B are not being replaced by another instruction being retired at the same time as the instruction which updates the register represented by the downstream storage location 66.

Finally, logic block 108B selects the contents of storage location 66A (the storage location 66 which is two positions upstream) into storage location 66C under one of two conditions: (i) one and only one of the compare signals corresponding to the downstream storage locations 66 or storage location 66C is asserted and the compare signal corresponding to storage location 66B is also asserted; or (ii) two of the compare signals corresponding to the downstream storage locations 66 and/or storage location 66B are asserted. Condition (i) covers the case in which one downstream storage location is storing a committed register state which is being replaced and the committed register state stored in the immediately upstream storage location is also being replaced. Condition (ii) covers the case in which two downstream storage locations are being replaced.

Since storage location 66B may receive a committed register state directly from speculative storage section 50, select logic block 108A operates slightly differently than the other select logic blocks 108B–108M. Select logic block 108A also accounts for a second instruction being retired via second retire value bus 98, second retire LIB bus 100, and second retire register bus 102. In addition to the rules listed above, select logic 108A selects the committed register state provided by buses 98, 100, and 102 if a second instruction is being retired thereupon.

The shifting operation of the shiftable queue employed by retired section 52 may be extended to any number of concurrently retireable instructions in other contemplated embodiments. For example, the microprocessor shown in FIG. 1 may be configured to retire up to three instructions concurrently when the line-oriented reorder buffer configuration is used. Such a configuration implies a shiftable queue wherein a particular storage location may retain its present value or receive a value from the immediately upstream storage location, the storage location which is two positions upstream, or the storage location which is three positions upstream. The present value is retained if none of the downstream compare signals (including the compare signals for the particular storage location) are asserted. The value from the immediately upstream storage location is selected if one downstream compare signal is asserted and the immediately upstream compare signal is not asserted. The value from the storage location two positions upstream is selected if: (i) one downstream compare signal is asserted, the immediately upstream compare signal is asserted, and the two positions upstream compare signal is not asserLed; or (ii) two downstream compare signals are asserted and the two positions upstream compare signal is not asserted. The value from the storage location three positions upstream is selected if: (i) one downstream compare signal is asserted, the immediately upstream compare signal is asserted, and the two positions upstream compare signal is asserted; (ii) two downstream compare signals are asserted and the immediately upstream compare signal is asserted; or (ii) three downstream compare signals are asserted.

It is noted that the retire buses 74, 96, and 102 may generally include a valid signal indicating that a committed register state is being conveyed. The valid signal is included in the comparisons performed by the various comparator circuits such that an asserted output signal does not occur unless the valid signal is asserted. It is further noted that storage locations 66A and 66B do not update with the contents of the retire buses connected thereto unless the valid signal is asserted. For example, a multiplexor may be included with a feedback path from storage location 66A and the retire buses, selected by the valid signal. It is still further noted that the preceding discussion of FIGS. 4 and 5 assumes that the retirement values conveyed are for dissimilar architected registers. If two instructions are simultaneously retired which update the same architected register, only the update corresponding to the latter instruction (in program order) is conveyed. Other methods for handling multiple updates to the same register being retired concurrently may be employed.

Turning now to FIG. 6, an exemplary update of the embodiment of retired storage section 52 as depicted in FIG. 5 is shown. An initial contents of retired storage section 52 is shown for an embodiment employing the x86 microprocessor architecture (reference numeral 110). Eight storage locations 66 are shown, numbered 0 through 7 for reference in the discussion of FIG. 6 Each storage location includes a committed register state $V_0$ through $V_7$ and a register indicator identifying the register corresponding to that committed register state. It is noted that encoded values are actually used as register identifiers, although textual identifiers are shown in FIG. 6 for clarity. During a clock cycle, two new committed register states corresponding to two retiring instructions are conveyed to retired storage section 52. The registers updated are EAX and EDX, and the new committed register states are $V_8$ and $V_9$.

A horizontal dotted line 112 separates the initial contents 110 of retired storage section 52 and the final contents 114 of retired storage section 52 (after committal of committed register states $V_8$ and $V_9$). In initial contents 110, the EAX register is stored in location 2 and the EDX register is stored in location 5. Therefore, no downstream storage locations from location 6 and 7 match the registers being updated, and these storage locations remain unchanged in the final contents 114. One downstream storage location from locations 5 and 4 matches a register being updated (EDX, originally in location 5). Additionally, the immediately upstream locations (locations 4 and 3, arespctively) do not store a register which matches one of the update registers. Therefore, locations 5 and 4 receive the contents of immediately upstream storage locations 3 and 4, respectively. Hence, location 5 stores $V_4$ and EBP in final contents 114 while location 4 stores $V_3$ and EBX.

Similar to locations 5 and 4, location 3 has only one downstream location which stores a register matching one of the update registers. However, the immediately upstream location to location 3 (location 2) also stores a register which matches one of the update registers (EAX). Therefore, location 3 receives the value stored two positions upstream (location 1). Hence, location 3 in final contents 114 stores $V_1$ and ESP.

Location 2 detects that two downstream locations (locations 2 and 5) are storing registers matching the update registers. Therefore, location 2 receives the value stored two locations upstream (location 0). Hence, location 2 in final contents 114 stores $V_0$ and ECX. Finally, locations 1 and 0 store the newly committed register states $V_9$ and $V_8$, respectively.

Figure 7:
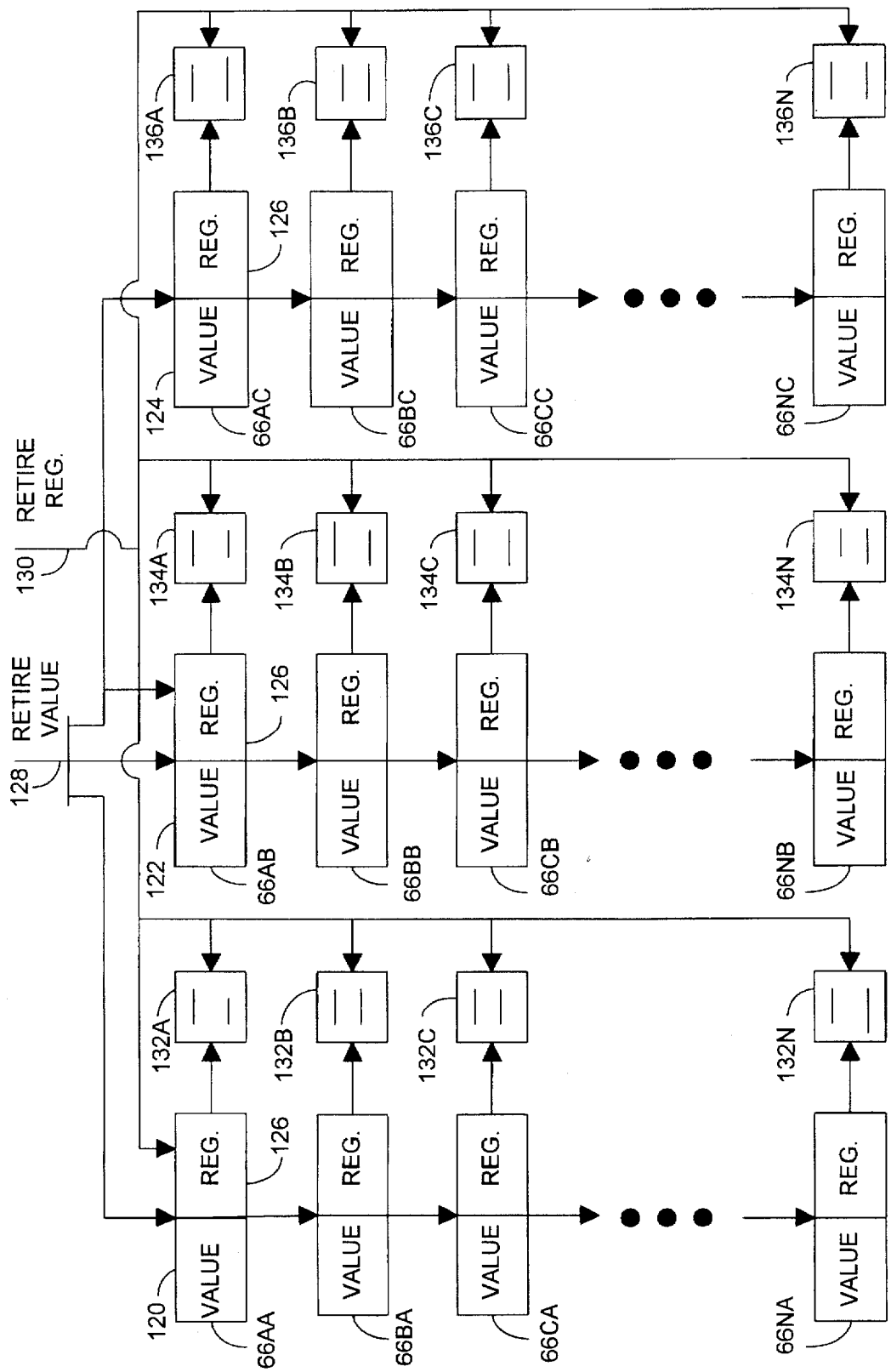
FIG. 7 is a block diagram of a third embodiment of the retired section shown in FIG. 3, wherein portions of registers may be updated.

Turning now to FIG. 7, a block diagram of a third embodiment of retired storage section 52 is shown. The embodiment shown in FIG. 7 is employed when portions of an architected register may be independently updated from other portions in response to instruction execution. For example, the x86 microprocessor architecture specifies 32 bit registers. The entire 32 bits may be updated, the least significant 16 bits may be updated, the least significant 8 bits may be updated, or the most significant 8 bits of the least significant 16 bits may be updated in response to execution of various instructions. For example, if the EAX register is specified as a destination of an instruction, the entire 32 bits of the EAX register are updated. If the AX register is specified as a destination, the least significant 16 bits of the EAX register are updated. If the AL register is specified as a destination, the least significant 8 bits of the EAX register are updated. Finally, if the AH register is specified as a destination, the most significant 8 bits of the least significant 16 bits of the EAX register are updated.

The block diagram of FIG. 7 depicts a structure for handling partial updates of a register within retired storage section 52. Each storage location from the embodiments depicted in FIGS. 4 and 5 is divided into independent sections. For example, storage location 66A may be divided into independent sections 66AA, 66AB, and 66AC. Section 66AA stores the most significant 16 bits of a register. Section 66AB stores the most significant eight bits of the least significant 16 bits of a register. Finally, section 66AC stores the least significant eight bits of a register. Similarly, storage locations 66B–66N are divided into independent sections 66BA–66NC. Each independent section includes a value field 120, 122, or 124 which stores a portion of a committed register state. Additionally, a register field 126 is included for identifying the register associated with the portion of the committed register state. Still further, an LIB bit (not shown) may be stored for each section. It is noted that each register requires multiple LIB bits, one for each section of the register, to distinguish the "last" update to each section.

Although sections 66AA, 66AB, and 66AC are considered to be portions of storage location 66A as shown in FIGS. 4 and 5, sections 66AA, 66AB, and 66AC need not be storing the various sections of the same register. For example, section 66AA may store a portion of the EAX register, section 66AB may store a portion of the EBX register, and section 66AC may store a portion of the ECX register. Since a register field 126 is included in each section 66AA, 66AB, and 66AC, the portions may be independently identified. In this manner, the sections of the registers may be maintained independently via three shiftable queue structures. If an instruction updates one section of the register but not another, the shiftable queue corresponding to the updated section shifts but the shiftable queue(s) corresponding to the non-updated section(s) does not. For example, an update of the EAX register may update storage locations 66AA, 66AB, and 66AC. However, a BX register updates storage locations 66AB and 66AC, leaving storage location 66AA unmodified. An AL update updates storage location 66AC and leaves storage locations 66AA and 66AB unmodified. Lastly, a DH update modifies storage location 66AB while storage locations 66AA and 66AC are unmodified.

A retire value bus 128 is shown in FIG. 7. Retire value bus 128 is divided into its corresponding sections and the sections are fed to each of the shiftable queue structures. Additionally, a retire register bus 130 is shown which conveys an indication of the register being updated. Retire register bus 130 further conveys multiple valid signals, one for each of the sections. The corresponding valid signal and the register indicator are conveyed to comparator circuits 132A–132N, 134A–134N, and 136A–136N. Each comparator circuit compares the register indicator stored in the corresponding register field 126 of the section coupled thereto. The corresponding valid signal is also included in the comparison, such that no shifting occurs if the portion of the register represented by a shiftable queue structure is not being updated. Dependency checking against retired storage section 52 as shown in FIG. 7 proceeds in a similar fashion, with the register value being formed by concatenating the appropriate values from the various sections.

It is noted that, although FIG. 7 depicts hardware for updating a register divided into three sections, similar hardware may be employed for updating any number sections of a register. Additionally, the size of the portions may be varied in any desired fashion.

Although the x86 microprocessor architecture is used herein as a specific example, any microprocessor architecture may be employed by microprocessor 10 without departing from the spirit and scope of the appended claims.

Figure 8:
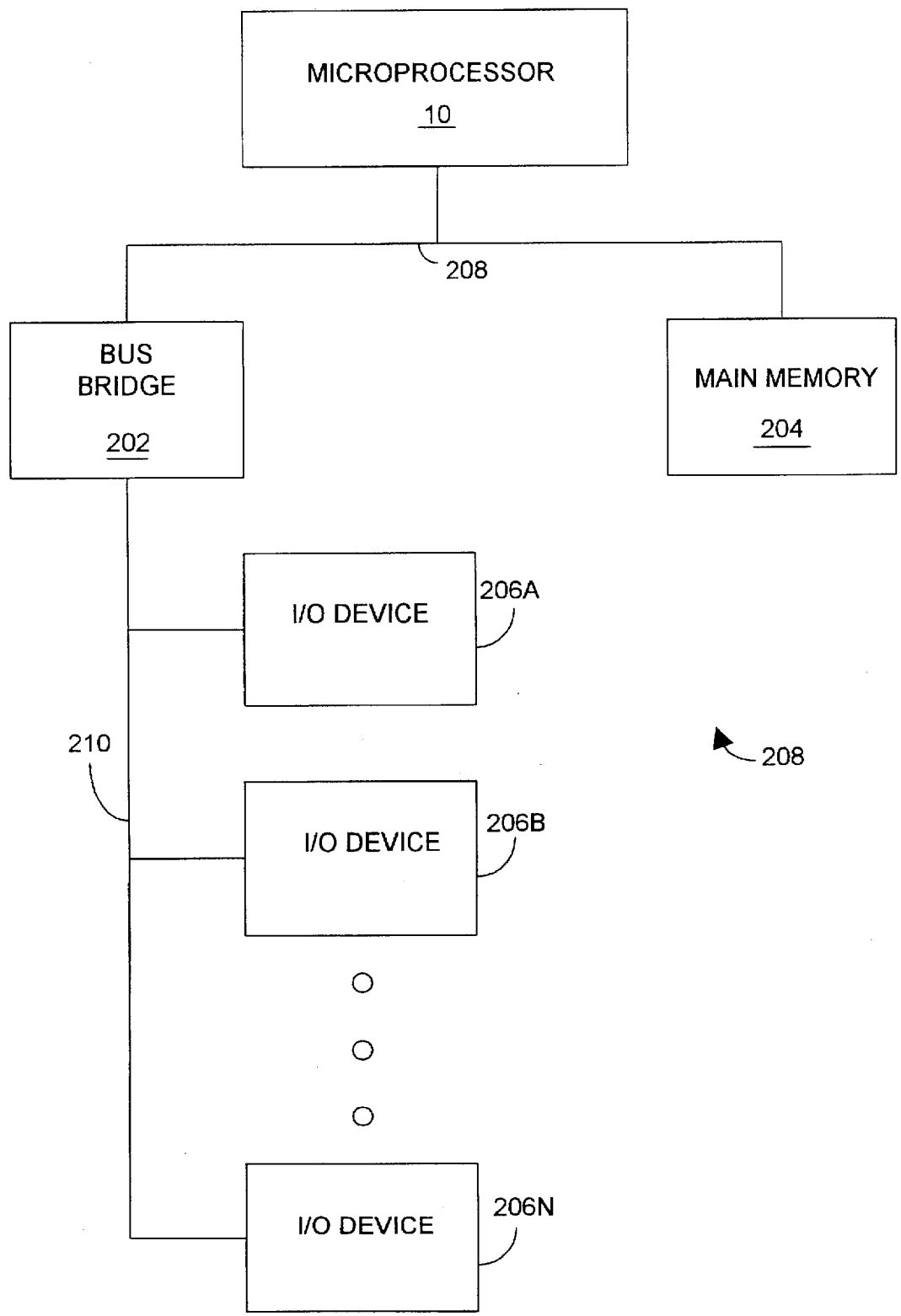
FIG. 8 is a block diagram of one embodiment of a computer system including the microprocessor shown in FIG. 1.

Turning now to FIG. 8, a computer system 200 including microprocessor 10 is shown. Computer system 200 further includes a bus bridge 202, a main memory 204, and a plurality of input/output (I/O) devices 206A–206N. Plurality of I/O devices 206A–206N will be collectively referred to as I/O devices 206. Microprocessor 10, bus bridge 202, and main memory 204 are coupled to a system bus 208. I/O devices 206 are coupled to an I/O bus 210 for communication with bus bridge 202.

Bus bridge 202 is provided to assist in communications between I/O devices 206 and devices coupled to system bus 208. I/O devices 206 typically require longer bus clock cycles than microprocessor 10 and other devices coupled to system bus 208. Therefore, bus bridge 202 provides a buffer between system bus 208 and input/output bus 210. Additionally, bus bridge 202 translates transactions from one bus protocol to another. In one embodiment, input/output bus 210 is an Enhanced Industry Standard Architecture (EISA) bus and bus bridge 202 translates from the system bus protocol to the EISA bus protocol. In another embodiment, input/output bus 210 is a Peripheral Component Interconnect (PCI) bus and bus bridge 202 translates from the system bus protocol to the PCI bus protocol. It is noted that many variations of system bus protocols exist. Microprocessor 10 may employ any suitable system bus protocol.

I/O devices 206 provide an interface between computer system 200 and other devices external to the computer system. Exemplary I/O devices include a modem, a serial or parallel port, a sound card, etc. I/O devices 206 may also be referred to as peripheral devices. Main memory 204 stores data and instructions for use by microprocessor 10. In one embodiment, main memory 204 includes at least one Dynamic Random Access Memory (DRAM) and a DRAM memory controller.

It is noted that although computer system 200 as shown in FIG. 8 includes one bus bridge 202, other embodiments of computer system 200 may include multiple bus bridges 202 for translating to multiple dissimilar or similar I/O bus protocols. Still further, a cache memory for enhancing the performance of computer system 200 by storing instructions and data referenced by microprocessor 10 in a faster memory storage may be included. The cache memory may be inserted between microprocessor 10 and system bus 208, or may reside on system bus 208 in a "lookaside" configuration.

It is still further noted that the present discussion may refer to the assertion of various signals. As used herein, a signal is "asserted" if it conveys a value indicative of a particular condition. Conversely, a signal is "deasserted" if it conveys a value indicative of a lack of a particular condition. A signal may be defined to be asserted when it conveys a logical zero value or, conversely, when it conveys a logical one value. Additionally, various values have been described as being discarded in the above discussion. A value may be discarded in a number of manners, but generally involves modifying the value such that it is ignored by logic circuitry which receives the value. For example, if the value comprises a bit, the logic state of the value may be inverted to discard the value. If the value is an n-bit value, one of the n-bit encodings may indicate that the value is invalid. Setting the value to the invalid encoding causes the value to be discarded. Additionally, an n-bit value may include a valid bit indicative, when set, that the n-bit value is valid. Resetting the valid bit may comprise discarding the value. Other methods of discarding a value may be used as well. Table 1 below indicates fast path, double dispatch, and MROM instructions for one embodiment of microprocessor 10 employing the x86 instruction set:

TABLE 1 x86 Fast Path, Double Dispatch, and MROM Instructions

| X86 Instruction | Instruction Category |
|---|---|
| AAA | MROM |
| AAD | MROM |
| AAM | MROM |
| AAS | MROM |
| ADC | fast path |
| ADD | fast path |
| AND | fast path |
| ARPL | MROM |
| BOUND | MROM |
| BSF | fast path |
| BSR | fast path |
| BSWAP | MROM |
| BT | fast path |
| BTC | fast path |
| BTR | fast path |
| BTS | fast path |
| CALL | fast path/double dispatch |
| CBW | fast path |
| CWDE | fast path |
| CLC | fast path |
| CLD | fast path |
| CLI | MROM |
| CLTS | MROM |
| CMC | fast path |
| CMP | fast path |
| CMPS | MROM |
| CMPSB | MROM |
| CMPSW | MROM |
| CMPSD | MROM |
| CMPXCHG | MROM |
| CMPXCHG8B | MROM |
| CPUID | MROM |
| CWD | MROM |
| CWQ | MROM |
| DDA | MROM |
| DAS | MROM |
| DEC | fast path |
| DIV | MROM |
| ENTER | MROM |
| HLT | MROM |
| IDIV | MROM |
| IMUL | double dispatch |
| IN | MROM |
| INC | fast path |
| INS | MROM |
| INSB | MROM |
| INSW | MROM |
| INSD | MROM |
| INT | MROM |
| INTO | MROM |
| INVD | MROM |
| INVLPG | MROM |
| IRET | MROM |
| IRETD | MROM |
| Jcc | fast path |
| JCXZ | double dispatch |
| JECXZ | double dispatch |
| JMP | fast path |
| LAHF | fast path |
| LAR | MROM |
| LDS | MROM |
| LES | MROM |
| LFS | MROM |
| LGS | MROM |
| LSS | MROM |
| LEA | fast path |
| LEAVE | double dispatch |
| LGDT | MROM |
| LIDT | MROM |
| LLDT | MROM |
| LMSW | MROM |
| LODS | MROM |
| LODSB | MROM |
| LODSW | MROM |

TABLE 1-continued x86 Fast Path, Double Dispatch, and MROM Instructions

| X86 Instruction | Instruction Category |
|---|---|
| LODSD | MROM |
| LOOP | double dispatch |
| LOOPcond | MROM |
| LSL | MROM |
| LTR | MROM |
| MOV | fast path |
| MOVCC | fast path |
| MOV.CR | MROM |
| MOV.DR | MROM |
| MOVS | MROM |
| MOVSB | MROM |
| MOVSW | MROM |
| MOVSD | MROM |
| MOVSX | fast path |
| MOVZX | fast path |
| MUL | double dispatch |
| NEG | fast path |
| NOP | fast path |
| NOT | fast path |
| OR | fast path |
| OUT | MROM |
| OUTS | MROM |
| OUTSB | MROM |
| OUTSW | MROM |
| OUTSD | MROM |
| POP | double dispatch |
| POPA | MROM |
| POPAD | MROM |
| POPF | MROM |
| POPFD | MROM |
| PUSH | fast path/double dispatch |
| PUSHA | MROM |
| PUSHAD | MROM |
| PUSHF | fast path |
| PUSHFD | fast path |
| RCL | MROM |
| RCR | MROM |
| ROL | fast path |
| ROR | fast path |
| RDMSR | MROM |
| REP | MROM |
| REPE | MROM |
| REPZ | MROM |
| REPNE | MROM |
| REPNZ | MROM |
| RET | double dispatch |
| RSM | MROM |
| SAHF | fast path |
| SAL | fast path |
| SAR | fast path |
| SHL | fast path |
| SHR | fast path |
| SBB | fast path |
| SCAS | double dispatch |
| SCASB | MROM |
| SCASW | MROM |
| SCASD | MROM |
| SETcc | fast path |
| SGDT | MROM |
| SIDT | MROM |
| SHLD | MROM |
| SHRD | MROM |
| SLDT | MROM |
| SMSW | MROM |
| STC | fast path |
| STD | fast path |
| STI | MROM |
| STOS | MROM |
| STOSB | MROM |
| STOSW | MROM |
| STOSD | MROM |
| STR | MROM |
| SUB | fast path |
| TEST | fast path |

TABLE 1-continued x86 Fast Path, Double Dispatch, and MROM Instructions

| X86 Instruction | Instruction Category |
| --- | --- |
| VERR | MROM |
| VERW | MROM |
| WBINVD | MROM |
| WRMSR | MROM |
| XADD | MROM |
| XCHG | MROM |
| XLAT | fast path |
| XLATB | fast path |
| XOR | fast path |

*Note:
Instructions including an SIB byte are also considered double dispatch instructions.

It is noted that a superscalar microprocessor in accordance with the foregoing may further employ the latching structures as disclosed within the co-pending, commonly assigned patent application entitled "Conditional Latching Mechanism and Pipelined Microprocessor Employing the Same", Ser. No. 08/400,608 filed Mar. 8, 1995, now abandoned by Pflum et al. The disclosure of this patent application is incorporated herein by reference in its entirety.

It is further noted that aspects regarding array circuitry may be found in the co-pending, commonly assigned patent application entitled "High Performance Ram Array Circuit Employing Self-Time Clock Generator for Enabling Array Access", Ser. No. 08/473,103 filed Jun. 7, 1995 by Tran, now U.S. Pat. No. 5,619,464. The disclosure of this patent application is incorporated herein by reference in its entirety.

It is additionally noted that other aspects regarding superscalar microprocessors may be found in the following co-pending, commonly assigned patent applications: "Linearly Addressable Microprocessor Cache", Ser. No. 08/146,381, filed Oct. 29, 1993 by Witt, now adandoned; "Superscalar Microprocessor Including a High Performance Instruction Alignment Unit", Ser. No. 08/377,843, now abandoned filed Jan. 25, 1995 by Witt, et al; "A Way Prediction Structure", Ser. No. 08/522,181, filed Aug. 31, 1995 by Roberts, et al, now anandoned; "A Data Cache Capable of Performing Store Accesses in a Single Clock Cycle", Ser. No. 08/521,627, filed Aug. 31, 1995 by Witt, et al; "A Parallel and Scalable Instruction Scanning Unit", Ser. No. 08/475,400, filed Jun. 7, 1995 by Narayan; and "An Apparatus and Method for Aligning Variable-Byte Length Instructions to a Plurality of Issue Positions", Ser. No. 08/582,473, filed Jan. 2, 1996 by Tran, et al. The disclosure of these patent applications are incorporated herein by reference in their entirety.

In accordance with the above disclosure, a reorder buffer is described which includes a speculative storage section and a retired storage section. The speculative storage section stores speculative register states which are converted to committed registers states by moving them into the retired storage section upon retirement of the corresponding instruction. Dependency checking is performed against the speculative and retired storage sections of the reorder buffer, easing the timing burdens and routing formerly experienced by the reorder buffer/register file combination.

Numerous variations and modifications will become apparent to those skilled in the art once the above disclosure is fully appreciated. It is intended that the following claims be interpreted to embrace all such variations and modifications.

What is claimed is:

1. A reorder buffer comprising:
   a speculative storage section configured to store speculative register states;
   a retired storage section configured to store committed register states; and
   a control unit coupled to said speculative storage section and said retired storage section, wherein said control unit selects a particular speculative register state for storage as a particular committed register state upon retirement of a corresponding instruction which generated said particular speculative register state.

2. The reorder buffer as recited in claim 1 wherein said retired storage section includes at least a number of storage locations equal to a number of architected registers.

3. The reorder buffer as recited in claim 2 wherein a particular one of said storage locations stores a first value corresponding to a first architected register during a first clock cycle and a second value corresponding to a second architected register during a second clock cycle.

4. The reorder buffer as recited in claim 2 wherein each storage location is configured to store a value corresponding to one of said architected registers as well as an indication of which of said architected registers corresponds to said value.

5. The reorder buffer as recited in claim 4 wherein a first one of said storage locations is coupled to a second one of said storage locations such that said value and said indication stored in said first one of said storage locations is shiftable into said second one of said storage locations.

6. The reorder buffer as recited in claim 5 wherein said retired storage section further comprises a comparator circuit coupled to receive said indication from a third one of said storage locations and to receive a second indication of a register corresponding to said particular speculative register state, and wherein said comparator circuit asserts an output signal if said indication from said third one of said storage locations and said second indication compare equal.

7. The reorder buffer as recited in claim 6 wherein said value and said indication stored in said first one of said storage locations are shifted from said first one of said storage locations to said second one of said storage locations upon said assertion of said output signal.

8. The reorder buffer as recited in claim 7 wherein said third one of said storage locations is coupled to said second one of said storage locations such that said value and said indication storage in said second one of said storage locations is shiftable into said third one of said storage locations.

9. The reorder buffer as recited in claim 8 further comprising a second comparator circuit coupled to said second of said storage locations and coupled to receive said second indication of a register corresponding to said particular speculative register state, and wherein said second comparator circuit asserts a second output signal if said indication from said second one of said storage locations and said second indication compare equal.

10. The reorder buffer as recited in claim 9 wherein said value and said indication stored in said first one of said storage locations is shifted into said second one of said storage locations if said second output signal is asserted.

11. The reorder buffer as recited in claim 4 wherein said value is divided into a first independent portion and a second independent portion, and wherein said storage locations are each divided into a first storage location and a second storage location, and wherein said first storage location stores said first independent portion, and wherein said second storage location stores said second independent portion.

12. The reorder buffer as recited in claim 11 wherein said first storage location is coupled to a first comparator circuit and said second storage location is coupled to a second comparator circuit, and wherein said first comparator circuit and said second comparator circuit each receive a second indication of a register corresponding to said particular speculative register state, and wherein said first comparator circuit and said second comparator circuit are configured to compare said indication stored in said respective first and second storage locations to said second indication.

13. The reorder buffer as recited in claim 12 wherein said first storage location is separately shiftable from said second storage location in response to respective first and second comparator circuits.

14. The reorder buffer as recited in claim 1 further comprising a second control unit coupled to said speculative storage section and said retired storage section, and wherein said second control unit is coupled to receive operand requests corresponding to instructions being dispatched, and wherein said second control unit is configured to perform dependency checking of said operands requested against said speculative register states and said committed registers states, and wherein said second control unit is configured to forward said operands based upon said dependency checking.

15. A method for operating a reorder buffer, comprising:

storing an instruction execution result corresponding to an instruction into a speculative storage section of said reorder buffer;

selecting said instruction for retirement; and moving said instruction execution result into a retirement section of said reorder buffer upon said selecting.

16. The method as recited in claim 15 wherein said moving comprises shifting said instruction execution result and an indication of a register updated by said instruction into a first storage location within said retirement section.

17. The method as recited in claim 16 wherein said moving further comprises shifting a previous value and a previous indication stored in said first storage location into a second storage location within said retirement section if said previous indication is dissimilar from said indication.

18. The method as recited in claim 17 wherein said moving further comprises discarding said previous value and previous indication if said previous indication is equal to said indication.

19. A microprocessor comprising:

a plurality of functional units configured to execute instructions and provide corresponding instruction execution results to a reorder buffer; and said reorder buffer coupled to said plurality of functional units, wherein said reorder buffer is configured to receive said instruction execution results from said plurality of functional units, and wherein said reorder buffer is configured to maintain said instruction execution results as speculative instruction execution results until said instructions are retired, and wherein said reorder buffer is configured to maintain a particular instruction execution result as a committed instruction execution result upon retirement of a corresponding instruction until a subsequent instruction which updates a register updated by said committed instruction execution result is retired.

20. The microprocessor as recited in claim 19 wherein said reorder buffer performs dependency checking for an instruction being dispatched by said microprocessor against both said speculative instruction execution results and said committed instruction execution results.

\* \* \* \* \*